Aug. 5, 1958 F. L. DEAL 2,845,654
SHRIMP EVISCERATING AND SHELLING MACHINE
Filed July 18, 1955 3 Sheets-Sheet 2
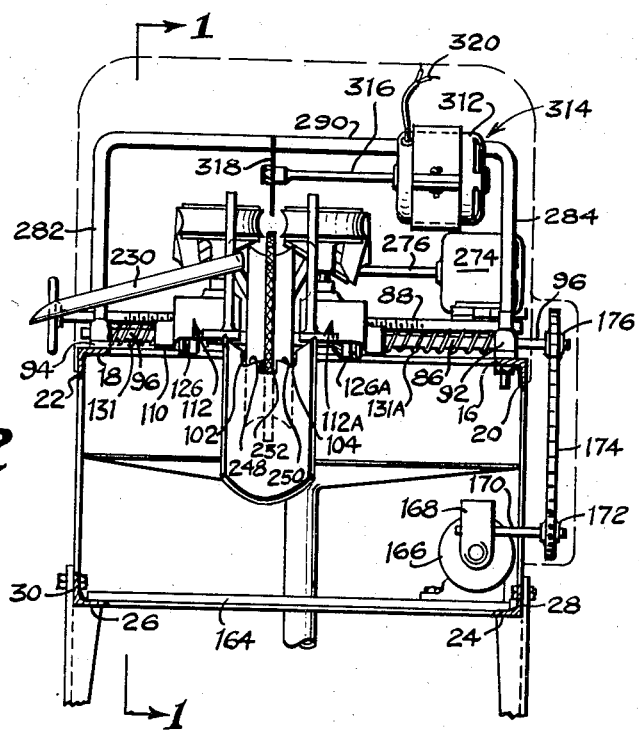
Fig. 2
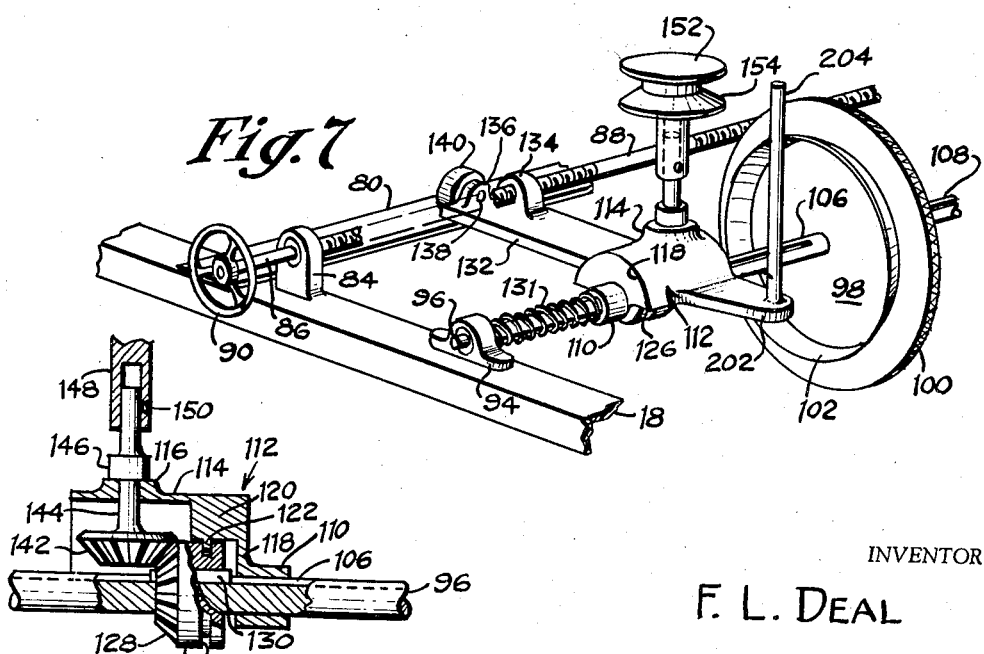
Fig. 7
Fig. 8
INVENTOR
F. L. DEAL
BY Kimmel & Crowell
ATTORNEYS Aug. 5, 1958        F. L. DEAL        2,845,654
SHRIMP EVISCERATING AND SHELLING MACHINE
Filed July 18, 1955        3 Sheets-Sheet 3
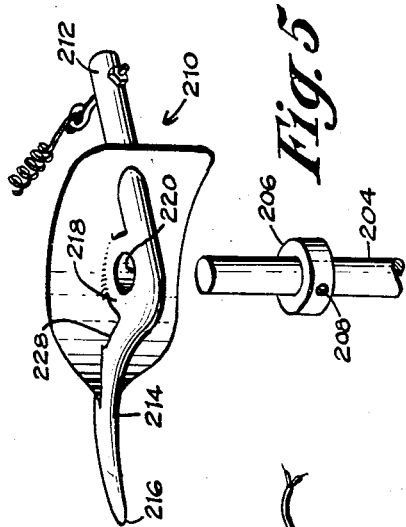
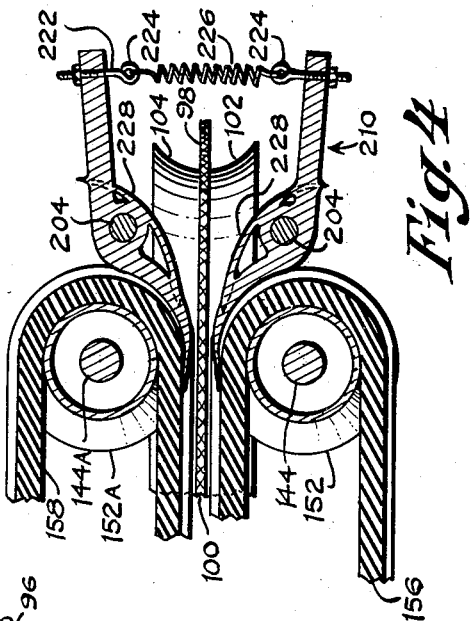
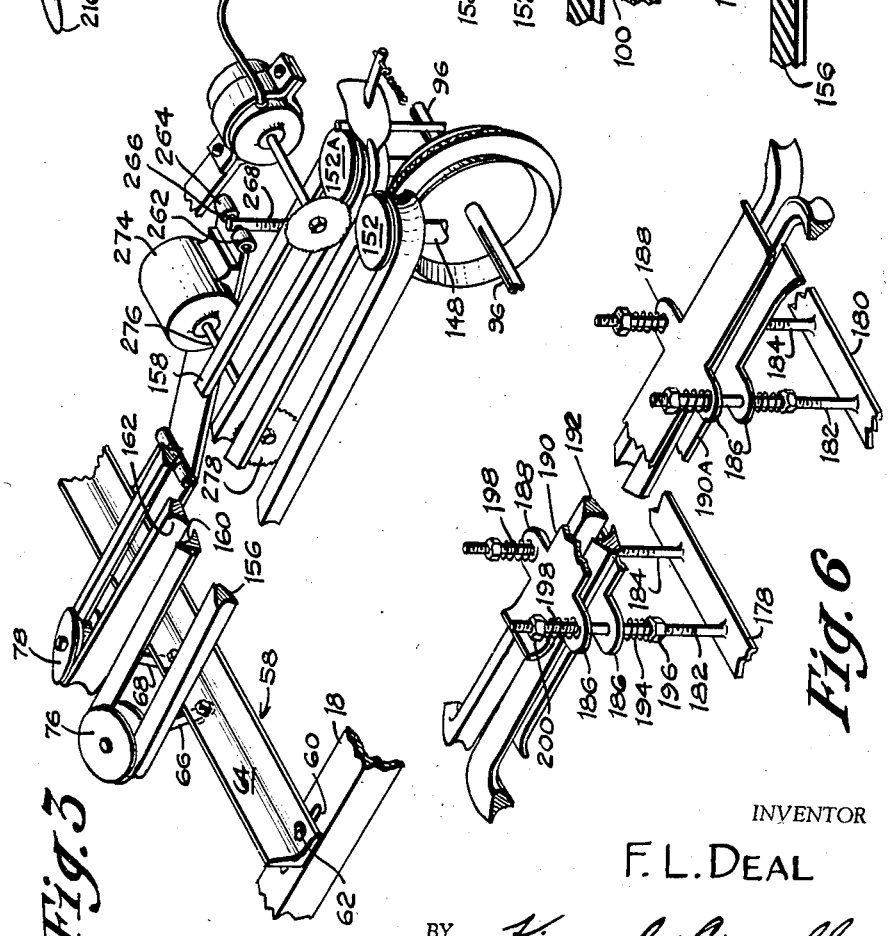
INVENTOR
F. L. DEAL
BY Kimmel & Crowell
ATTORNEYS

United States Patent Office 2,845,654
Patented Aug. 5, 1958

2,845,654

SHRIMP EVISCERATING AND SHELLING MACHINE

Frank L. Deal, Brunswick, Ga.

Application July 18, 1955, Serial No. 522,651

6 Claims. (Cl. 17—2)

This invention relates to apparatus especially designed to remove shell from seafood, and more specifically, the invention pertains to the provision of means for eviscerating and shelling shrimp.

Fresh shrimps are generally shipped to fish stores, restaurants, and other similar purveyors of such food with the heads thereof removed but with the shells and tails intact.

Machines for eviscerating and shelling shrimps have been heretofore devised but none of such devices have proved to be satisafctory and positive in operation and, consequently, are not in general use. As a result, most of these operations are carried out by hand making the cost of the prepared shrimp quite expensive. It is therefore, an object of this invention to provide a machine which will accomplish the aforesaid operations in a positive manner and at a rapid rate.

Another object of this invention is to provide a shrimp eviscerating and shelling machine which will strip the shell from the shrimp over a major portion of the body thereof leaving the shell adjacent the tail of the shrimp, and splitting the shrimp to form what is known in the industry as fantails.

It is a further object of this invention to provide a shrimp eviscerating and shelling machine which is inexpensive to manufacture and assemble, non-complex in operation, and durable in use.

Other and further objects and advantages of the present invention will become more manifest from a consideration of the following specification when read in conjunction with the annexed drawings, in which:

Figure 2 is an end elevational view, partly in cross-section, taken on the vertical plane of line 2—2 Figure 1, looking in the direction of the arrows.

Figure 3 is a perspective view, partly broken away and with parts of the machine omitted for the purpose of clearer illustration.

Figure 4 is an enlarged fragmentary detail cross-sectional view taken on the horizontal plane of line 4—4 of Figure 1, looking in the direction of the arrows.

Figure 5 is an enlarged exploded perspective view of one of the shelling fingers and mounting therefor.

Figure 6 is an enlarged fragmentary perspective view illustrating details of the conveyor track with parts broken away and in section.

Figure 7 is an enlarged fragmentary perspective view illustrating the shrimp belly splitting knife and the adjustable means therefor.

Figure 8 is an enlarged detail fragmentary cross-sectional view illustrating the train drive for the conveyor belts.

Figure 1:
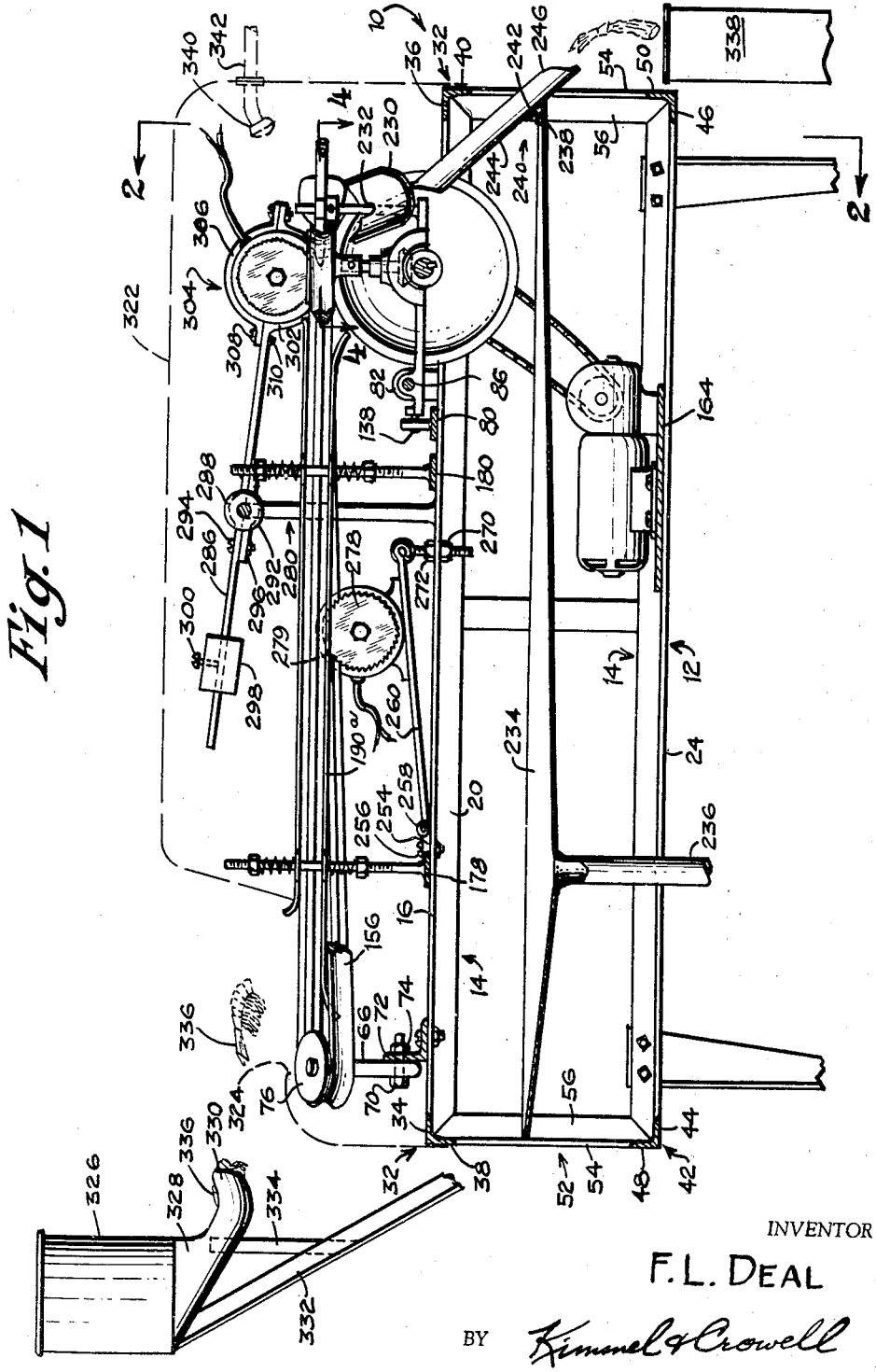
Figure 1 is a longitudinal cross-sectional view, partly in elevation, taken on the vertical plane of line 1—1 of Figure 2, looking in the direction of the arrows.

Referring now more specifically to the drawings, reference numeral 10 designates, in general, a shrimp eviscerating and shelling machine constructed in accordance with the teachings of the present invention. As illustrated therein, the machine 10 is seen to comprise a substantially open rectangular frame 12 formed of angle members 14 of which the uppermost thereof are provided with laterally spaced, parallel, and longitudinally extending confronting horizontal top panels 16, 18 and laterally spaced, parallel, longitudinally extending and depending side panels 20, 22. The lowermost of the angle irons include laterally spaced, parallel, and longitudinally extending confronting bottom panels 24, 26 having integrally formed therewith the vertically extending, laterally spaced, longituindal side panels 28, 30. The adjacent ends of the uppermost angle irons 14 are connected by angle irons 32 having opposed, spaced, horizontal panels 34, 36 from which depend spaced opposed and confronting end panels 38, 40. Similar angle irons 42 connect to adjacent ends of the lowermost of the angle members 14 and comprise the spaced opposed parallel and confronting horizontal panels 44, 46 from which arise the vertical, spaced, parallel and confronting end panels 48, 50. The uppermost and lowermost of the angle irons 14 and 32 and the angle irons 14 and 42, respectively, are held in spaced relation by corner posts 52 having right angular sides 54, 56.

An angle iron 58 (see Figures 1 and 3) extends transversely of the frame 12 adjacent one end thereof and is supported by the horizontal panels 16, 18. Both panels are provided with oppositely disposed slots 60 to receive therethrough a bolt 62 which projects through the side wall 64 of the angle iron 58. The bolt 62 is, of course, provided with a nut (not shown) so that the angle iron 58 may be adjusted longitudinally of the frame 12 and secured in a selected position.

A pair of laterally spaced upright shafts 66, 68 have one of their respective ends pivotally mounted on bolts 70 which are locked on the side 72 of the angle iron 58 by nuts 74. Grooved pulleys 76, 78 are mounted for rotation on the other ends of the shafts 66, 68, respectively.

A substantially rectangular elongated cross-support member 80 (see Figures 1 and 7) extends transversely of the frame 12 adjacent its other or forward end and is fixedly secured to the panels 16, 18 by conventional means. Bearing blocks 82, 84 fixedly mounted on the panels 16, 18, respectively, forwardly of the cross-support member 80, receive for rotation therein smooth end portions of a cross-shaft 86 which is externally threaded over an intermediate portion 88 thereof. A manually operated hand wheel 90 is fixedly secured to one end of the shaft 86 for rotation therewith.

Forwardly of the shaft 86, a pair of journals 92, 94 are fixedly secured to the panels 16 and 18, respectively, and receive for rotation therein the opposed ends of a second cross-shaft 96. The shaft 96 is provided with a centrally positioned fixedly secured wheel 98 having a circumferentially extending knurled edge 100 and a pair of circular concave-convex flanges 102, 104 projecting laterally, respectively, from the opposed sides thereof, the concave sides of the flanges facing outwardly.

A pair of keyways 106, 108 are formed in the cross-shaft 96 and extend axially away from opposite sides of the wheel 98 and terminate at points adjacent the journals 94, 92, respectively.

As is seen in Figures 7 and 8, the shaft 96 is journalled for rotation in a bored boss 110 integrally formed at one end of an axially extending semi-cyclindrical gear box housing 112. The housing 112 includes a cylindrical side wall 114 having an outwardly projecting hollow boss 116, and an end wall 118. Adjacent the junction of the side wall 114 with the end wall 118 the housing 112 is provided with an integrally formed cylindrical shoulder 120 from the side wall of which projects an inwardly extending radial flange 122 which is adapted to engage within a circumferential groove 124 formed in the hub 126 of a bevel gear 128 keyed at 130 in the slot 106 for rotation with the shaft 96. A helicoidal spring 131 loosely surrounds the shaft 96, and one of its ends engages the journal 94 while the other end thereof abuts against the adjacent end of the boss 110; whereby the housing 112 is constantly biased for movement on the shaft 96 toward the wheel 98.

The housing 112 has integrally formed therewith a longitudinally extending substantially rectangular flange 132 which is provided, proximate its rear end with an internally threaded longitudinally positioned boss 134 which receives transversely therethrough the threaded portion 88 of the shaft 86, and at the rear terminus of flange 132 an integrally formed boss 136 has one end of a longitudinally extending stub axle 138 secured therein and a roller 140 mounted for rotation on the other end thereof. As is clearly seen in Figures 1 and 7, the roller 140 engages and is supported on the cross-support member 80.

From the above description, it is manifest that as the hand wheel 90 is rotated in one direction or the other the threaded engagement between the threaded portion 88 and the internally threaded boss 134 will effect axial adjustment of the housing toward and away from the wheel 98 on the shaft 96.

A bevel gear 142 is disposed in the housing 112 in mesh with the gear 128 and is fixedly secured for rotation with one end of an elongated upright shaft 144, the other end of which projects through the hollow boss 116. A radial flange 146 integrally formed with the shaft 144 abuts against the boss 116 and limits the downward movement thereof into the housing 112. The outer or upper end of the shaft 144 is received in an elongated cylindrical collar or hub 148 and is secured thereto by a set screw 150. The upper end of the hub 148 is integrally connected with a pulley 152 grooved at 154.

A housing, identical to the housing 112, is mounted on the other side of the wheel 98 on the shaft 96 and this housing together with the component parts thereof and associated coacting elements finding counter-parts and coacting elements with respect to the housing 112 bear identical reference numerals followed by the letter "A."

A pair of V-shaped endless belts 156, 158 are trained about the pulleys 76, 152 and 78, 152A, respectively, in spaced relation relative to one another. The outer sides of the belts 156, 158 are provided with a concave configuration 160, 162, respectively.

A motor supporting substantially rectangular plate 164 has a pair of its opposed ends fixedly mounted on the confronting panels 24, 26 and supports an electric motor 166 which is connected in driving relation with a conventional speed reducer 168 having an output shaft 170. A sprocket 172 is mounted for rotation on the shaft 170 and connects, in driving relation, through the endless chain 174 with a driven sprocket 176 fixedly secured to one end of the shaft 96.

The motor 166 is connected with a suitable source of electrical energy and when energized causes the shaft 96 to rotate through the sprockets 172, 176 and chain 174. This effects movement of the belts 156, 158 through the pulleys 152, 152A through the aforedescribed gear trains disposed in the housings 112, 112A. As is clearly seen in Figure 2, the serrated edge 100 of the wheel 98 projects upwardly a short distance above the lower sides of the belts 156, 158 intermediate the adjacent sides thereof.

Referring now more specifically to Figures 1 and 6 of the drawings, a pair of longitudinally spaced substantially rectangular transversely extending cross-plates 178, 180 have their respective ends fixedly secured to the top panels 16, 18, the plates 178, 180 being disposed in downwardly spaced relation with respect to the lower sides of the belts 156, 158. Each of the cross-plates 178, 180 have fixedly secured thereto one of the ends of a pair of upright externally threaded standards 182, 184 which project above the belts 156, 158 adjacent the outer sides thereof. The standards 182, 184 each extend through aligned centrally apertured lobes 186, 188 which project laterally from opposite sides, respectively, of a pair of elongated longitudinally extending substantially rectangular metallic strips 190, 190A disposed above and below the belts 156, 158 and bridging over a major distance the space between the adjacent confronting sides 160, 162. The plates 190, 190A terminate at their forward ends adjacent the pulleys 152, 252A and, taken together with the adjacent portions of the belts 156, 168, comprise an elongated closed compartment 192 having movable side walls.

Helicoidal springs 194 surround each of the standards 182, 184 adjacent the lower ends thereof and are held under compression against the lobes 186, 188 of the lowermost strip 190A by means of nuts 196. Similar helicoidal springs 198 surround the upper ends of the standards 182, 184 and are held under compression against the lobes 186, 188 of the uppermost strip 190 by means of nuts 200. Thus it is seen that the upper and lower plates 190, 190A are constantly biased for movement toward each other and frictionally engage against the upper and lower sides of the belts 156, 158.

Referring now more specifically to Figures 1, 5 and 7, the semi-cylindrical housing 112 is provided with a substantially rectangular forwardly projecting flange 202 which is integrally formed therewith. One end of a vertically elongated rod 204 is fixedly secured to the flange 202 adjacent the forward end thereof and the upright rod 204 slidably receives a collar 206 secured adjacent its upper end by means of a set screw 208.

A shelling finger 210 combined with shrimp guide means is clearly illustrated in Figures 4 and 5. The combined means is seen to comprise a substantially cylindrical handle portion 212 having an arcuately shaped offset tine 214 which tapers from its inner end to its outer end 216 at which point it is extremely thin. Each of the tines 214 has a curvilinear outer side which complements the curvatures 160, 162 of the belts 156, 158, respectively. At the juncture of the tines 214 with their respective handle portions 212, the combined shelling and guide means 210 is formed with an integrally connected boss 218 which is provided with a central bore 220 which receives therein the upper end of the rod 204.

The outer ends of the pivotally mounted combined means are provided with confronting eye bolts 222 having the eye portions 224 thereof connected by the opposite ends of a substantially helicoidal spring 226 under tension. It is thus seen that the tines 214 are constantly urged for movement away from each other and snugly engage within the curvilinear surfaces 160, 162 of the belts 156, 158, respectively. The shrimp guide means comprises an integrally formed substantially rectangular plate 228 which connect at their inner ends with the tines 214, the outer surface of the boss 218, and fixedly surrounds and engages the handle portion 212. Again it should be noted, that the rods 204 are proximate the pulleys 152, 152A and are disposed, one on each side of the wheel 98.

An elongated trough 230 is provided with an elongated slot 232 which extends inwardly from an end thereof and projects laterally from the machine 10 and is fixedly secured to each of the rods 204 (only one being shown). The troughs 230 are adapted to catch shrimp which may be cast laterally from the wheel 98 and over the flanges 102, 104.

An elongated substantially rectangular pan 234 is fixedly secured to the corner posts 52 intermediate the ends thereof and is provided with a drain pipe 236. One side 238 of an angle iron 240 is fixedly secured to the forward end of the pan 234 intermediate the sides thereof, and the other side 242 of the angle member 240 is fixedly secured to the bight portion 244 of a second trough 246 which is forwardly and downwardly inclined from the wheel 98. As is seen in Figures 1 and 2 of the drawings, the second trough 246 is provided with a pair of oppositely disposed notched-out portions 248, 250 and the notched portion 252, substantially rectangular in configuration disposed between the notches 248, 250. The wheel 98 has the marginal circumferential edge portion thereof rotatably received within the notch 252 while the inner ends of the notched-out portions 248, 250 are placed in juxtaposition relative to the flanges 102, 104.

A substantially rectangular block 254 is bolted at 256 to the top panel 16 adjacent the cross-plate 178. The forward side of the block 254 is hingedly connected at 258 with an elongated substantially rectangular motor base plate 260, and the forward end of the motor base plate 260 is provided with a pair of integrally formed laterally spaced sleeves 262, 264 which receive therein the opposite ends of a pin 266. An externally threaded shaft 268 has one of its ends fixedly secured to the pin 266 intermediate the sleeves 262, 264, and the other end of the shaft 268 extends through a suitable aperture (not shown) formed in the top panel 16 and is locked in selected adjusted position by the nuts 270, 272 which engage opposite sides of the top panel 16.

An electric motor 274 is fixedly secured to the plate 260 by conventional means, and the outer end of the drive shaft 276 thereof has connected for rotation therewith a serrated cutting blade 278. As is seen in Figures 1, 2 and 3, the blade 278 extends through a slot 279 formed in the lower strip or plate 190A and is positioned between the belts 156, 158 intermediate the pulleys 76, 78, and 152, 152A and is adjustable to various heights therebetween by the shaft 268.

An inverted substantially U-shaped element 280 extends transversely of the frame 12 and has the lower end of the arms 282, 284 thereof welded or otherwise fixedly connected with the top panels 16, 18. An elongated substantially rectangular member 286 having an intermediate split bearing member 288 is bounded over the bight portion 290 of the U-shaped member 280, the bearing member 288 engaging over the bight 290. The second half 292 of the split bearing is fixedly connected to the elongated subtantially rectangular member 286 by bolts 294 and nuts 296.

A counterbalancing weight 298 is slidably mounted on the rectangular member 286 behind the bight 290 and is held in selected adjusted position by means of a set screw 300. The forward end of the rectangular member 286 terminates in a semi-circular off-set portion 302 which serves as a jaw for a clamp designated generally at 304. A second substantially semi-circular element 306 forming a second jaw is connected to the first jaw 302 by means of the bolts 308 and nuts 310.

As is seen in the drawings, the clamp 304 surrounds a motor casing 312 of an electric motor 314, and the drive shaft 316 of the motor 314 extends transversely of the frame 12 and has fixed for rotation therewith a serrated circular cutting blade 318. The cutting blade 318 extends downwardly between the belts 156, 158 adjacent the forward ends thereof. A cable 320 connects the motor 314 with any suitable source of electrical energy.

It is proposed to enclose all of the moving elements of the above described machine in a suitable casing indicated in broken lines by the reference numeral 322. Of course, the casing is provided with an opening 324 adjacent the rear end of the machine in order to provide access thereto. It is also contemplated, as a further feature of this invention, to provide hopper means 326 for shrimp to be shelled and eviscerated, the hopper having a downwardly extending trough 328 which terminates at its free end 330 in an upwardly curved section. Suitable bracing means 332, 334 rigidly connect the hopper with the frame 12 at any desirable point, or the hopper 326 may be supported in any other manner.

In operation, a headless shrimp 336 is taken from the open free end 330 of the trough 328, and with the motor 166 energized, the shrimp 336 is placed between the moving belts 156, 158 at the rear of the machine 10 through the opening 324. The shrimp 336 is positioned between the belts with the back thereof facing upwardly and the tail extending rearwardly. Previous to the insertion of the shrimp into the machine 10, the distance between the belts 156, 158 is adjusted by pivoting the shafts 66, 68 toward or away from each other, and similar adjustments are made at the forward end of the machine by rotating the hand wheel 90 which effects the relative position of the pulleys 152 and 152A. It will be understood, of course, that the threaded portion 88 of the shaft 86 is provided with both right and left hand threads whereby the housing 112 will be moved toward and away from each other in order to achieve the desired adjustment between the belts 156, 158 at the forward end of the machine 10.

The belts 156, 158 convey the shrimp forwardly through the chamber 192, and as the shrimp reaches a position intermediate the ends of the chamber the energized motor 274 causes the serrated cutter 278 to penetrate and cut the shell at the underside or belly of the shrimp 336. The cutting operation extends from the forward end of the shell to a point proximate the tail of the shrimp. As the shrimp passes outwardly from the chamber 192, the back thereof is engaged by the serrated cutting blade 318 driven by the motor 314. At this point the shrimp 336 is substantially adjacent the pulleys 152, 152A and the opposite sides of the shell thereof are engaged by the tines 214 which then separate the shell from the meat of the shrimp and in so doing breaks the shell at a point adjacent the tail. The shrimp 336, at the time the blade 318 is cutting the back of the shell, is positioned on the circumference of the wheel 98 and is conveyed from the belts 156, 158 thereby into the trough 246 from whence it is discharged into a receptacle 338. In the event the discharged shrimp should fall laterally away from the wheel 98, the same is caught by one of the troughs 230 and discharged therefrom into any suitable container (not shown).

During the operation of the cutting blade 318, the vane or intestine in the back of the shrimp is removed thereby making unnecessary that the shrimp be manually handled at any stage of the processing thereof.

The adjustability of the cutting blade 278 in a vertical direction makes possible the slicing of the meat of the shrimp a sufficient distance to produce what is known in the trade as a fantail shrimp. However, it is emphasized and stressed that the depth of the cut of the blade 278 into the shrimp is not sufficient to destroy or cut the shell at the tail whereby the tail is preserved in order to facilitate the consumption thereof when served at the table.

Tension on the belts 156, 158 is maintained, of course, by shifting the angle iron 58 longitudinally of the frame 12. Further, if desired, a spray nozzle 340 connected with a suitable source of water under pressure through pipe 342 is mounted on the casing 322 and is directed toward the discharge end of the belts 156, 158. The discharged shell and water is collected by the pan 234 and is transferred to a sewer conduit through the drain pipe 236.

Having described and illustrated one embodiment of this invention in detail, it will be understood that the same is offered merely by way of example, and that the invention is to be limited only by the scope of the appended claims.

What is claimed is:

1. A shrimp shelling and eviscerating machine comprising an elevated elongated substantially rectangular frame, a pair of laterally spaced shafts secured to one end of said frame in upwardly extending diverging relation, a pulley journalled on each of said shafts, a pair of laterally spaced parallel drive shafts positioned adjacent the end of said frame opposite said diverging shafts, means on said frame supporting said drive shafts for rotary movement, a drive pulley affixed to each of said drive shafts, an endless belt trained about one of said first named pulleys and one of said drive pulleys on one side of said machine, a second endless belt trained about the other of said first named pulleys and the other of said drive pulleys on the other side of said machine, said endless belts being outwardly canted at one end thereof, said belts each having confronting concave sides, said confronting sides of said belts coacting and engaging against the sides of a shrimp to convey said shrimp from one of said ends of said frame to the other end thereof, cutting means mounted on said frame below said belts and extending upwardly intermediate thereof for cutting the shell of said shrimp at the belly portion thereof, cutting means mounted on said frame above said belts and extending downwardly therebetween for cutting the shell of said shrimp at the back portion thereof and substantially simultaneously therewith removing its intestine, both of said cutting operations terminating at a point adjacent the tail of said shrimp, and a pair of tines disposed adjacent said other end of said frame, said tines extending inwardly of said belts at the discharge end thereof and engaging between the body of said shrimp and the opposite sides of said shell to separate said shell from said body to said point adjacent said tail.

2. A shrimp shelling and evisceraitng machine as defined in claim 1, wherein the means supporting said drive shafts includes means for adjustably controlling the tension on said belts.

3. A shrimp shelling and eviscerating machine as defined in claim 1, and a wheel mounted for rotation on said frame below said back cutting means and extending upwardly between said belts for supporting shrimp for cutitng by said back cutting means and conveying shrimp away from said belts.

4. A shrimp shelling and eviscerating machine as defined in claim 1, and means adjustably controlling the tension of said belts, means adjustably controlling the lateral spacing between said belts, a wheel mounted on said frame below said back cutting means and extending upwardly between said belts for supporting shrimp for cutting by said back cutting means and conveying shrimp away from said belts, and a guide chute fixedly mounted on said frame, said chute having an end thereof disposed on opposite sides of said wheel.

5. A shrimp shelling and eviscerating machine as defined in claim 4, and a pair of chutes fixedly mounted on said frame, said pair of chutes having one of their respective ends positioned adjacent opposite sides of said wheel and the other of their respective ends projecting laterally away therefrom.

6. A shrimp shelling and eviscerating machine as defined in claim 5, and means adjustably controlling the distance each of said cutting means enters between said belts.

References Cited in the file of this patent

UNITED STATES PATENTS

| | | |
|---|---|---|
| 2,263,694 | Grayson | Nov. 25, 1941 |
| 2,546,414 | Abbott | Mar. 27, 1951 |
| 2,622,270 | Envoldsen | Dec. 23, 1952 |
| 2,659,930 | Jagger | Nov. 24, 1953 |
| 2,663,898 | Greiner | Dec. 29, 1953 |
| 2,684,500 | Jones et al. | July 27, 1954 |
| 2,685,705 | Streich et. al. | Aug. 10, 1954 |
| 2,760,225 | Miller | Aug. 28, 1956 |